US008074733B2

(12) United States Patent
Liu

(10) Patent No.: US 8,074,733 B2
(45) Date of Patent: Dec. 13, 2011

(54) THREE-STAGE VALVE SWITCH STRUCTURE

(76) Inventor: Pao-Fang Liu, Sanyi Township, Miaoli County (TW)

( * ) Notice: Subject to any disclaimer, the term of this patent is extended or adjusted under 35 U.S.C. 154(b) by 187 days.

(21) Appl. No.: 12/406,168

(22) Filed: Mar. 18, 2009

(65) Prior Publication Data

US 2010/0181086 A1 Jul. 22, 2010

(30) Foreign Application Priority Data

Jan. 16, 2009 (TW) ............................... 98101640 A

(51) Int. Cl.
*B23B 45/04* (2006.01)

(52) U.S. Cl. ........................................ 173/169; 173/168

(58) Field of Classification Search .................. 173/168, 173/169, 221
See application file for complete search history.

(56) References Cited

U.S. PATENT DOCUMENTS 2,947,283 A * 8/1960 Roggenburk ................... 418/15
3,326,240 A * 6/1967 Mcconnaughay ......... 137/637.4
3,510,099 A * 5/1970 Crump .......................... 251/116
3,624,820 A * 11/1971 Brown ....................... 415/152.1
3,880,245 A * 4/1975 Anderson, Jr. ................ 173/219
3,924,693 A * 12/1975 Whitehouse .................. 173/169
3,989,113 A * 11/1976 Spring et al. .................. 173/221
4,011,892 A * 3/1977 Kowalski ................. 137/625.66
4,024,892 A * 5/1977 Prisco et al. ............. 137/630.14
4,109,735 A * 8/1978 Bent ............................. 173/221
4,418,764 A * 12/1983 Mizobe ......................... 173/177
4,548,229 A * 10/1985 Johnson ........................ 137/270
4,776,561 A * 10/1988 Braunlich et al. .............. 251/39
5,083,619 A * 1/1992 Giardino et al. ................ 173/93
5,092,410 A * 3/1992 Wallace et al. .............. 173/93.5
5,303,781 A * 4/1994 Lin ............................... 173/169
5,309,714 A * 5/1994 Putney et al. .................... 60/407
5,377,769 A * 1/1995 Hasuo et al. .................. 173/169
5,775,439 A * 7/1998 Biek ................................. 173/1
5,797,462 A * 8/1998 Rahm ........................... 173/169
5,913,370 A * 6/1999 Chapelle et al. .............. 173/169
5,918,686 A * 7/1999 Izumisawa ...................... 173/20
6,062,323 A * 5/2000 Pusateri et al. ............... 173/169
6,164,387 A * 12/2000 Chang ........................... 173/169
6,443,239 B1 * 9/2002 Izumisawa .................... 173/169
6,609,539 B2 * 8/2003 Reinelt et al. ............ 137/625.66
6,634,438 B1 * 10/2003 Pusateri et al. ................... 173/1
6,708,779 B2 * 3/2004 Taga ............................. 173/104
6,883,619 B1 * 4/2005 Huang ......................... 173/93.5
6,902,011 B2 * 6/2005 Hall .............................. 173/169
7,051,568 B2 * 5/2006 Ciotti ......................... 72/453.01
7,140,179 B2 * 11/2006 Bass et al. ....................... 60/493
7,311,155 B2 * 12/2007 Chang ........................... 173/104
7,461,704 B2 * 12/2008 Chen ............................ 173/169
7,537,027 B2 * 5/2009 Bass et al. .................. 137/625.5

* cited by examiner

*Primary Examiner* — Rinaldi Rada
*Assistant Examiner* — Gloria R Weeks
(74) *Attorney, Agent, or Firm* — Ming Chow; Sinorica, LLC

(57) ABSTRACT

Disclosed is a three-stage valve switch structure, having a specifically designed main switch and an auxiliary switch, and is operated in cooperation with a forward rotation air passageway, and a reverse rotation air passageway, so that air of an air pump enters into a pneumatic device from said air passageway in driving an oil piston into forward rotation, pulling action, and reverse rotation; and said auxiliary switch is utilized in a condition that, in case that retrieving from a rivet nut done by a pneumatic machine tool is not complete, then said auxiliary switch can be pressed down for driving said pneumatic device into rotating its blades in a reverse manner, hereby reversely rotating said oil piston to make said retrieval from rivet nut more complete. The application of the present invention is not restricted to rivet-nut-riveter, it can also be utilized in pneumatic machine tools requiring forward rotation, pulling action, and reverse rotation functions.

27 Claims, 14 Drawing Sheets

THREE-STAGE VALVE SWITCH STRUCTURE

BACKGROUND OF THE INVENTION

1. Field of the Invention

The present invention relates to a valve switch, and in particular to a three-stage valve switch structure, that is capable of controlling the forward rotation, reverse rotation and pulling action in an existing manual machine tool.

2. The Prior Arts

In general, a blind-rivet-riveter is utilized in a manual machine tools for assembling plate members, such as the connection and fastening of the plate members, and that is achieved through putting a rivet through two plate members, and putting in a rivet mandrel for pulling rivet and for biting by making use of a rivet-setting device having jaw bits in a head portion of a blind-rivet-riveter, such that when user presses down on a handle, a rivet-setting device will be actuated to retract backward, so that a riveting mandrel will move backward to cause deformation wrinkles of a tube member of a rivet, hereby realizing connection and fastening of plate members. Usually, a blind-rivet-riveter is also referred to as a rivet-pulling-riveter, that is a kind of manual machine tool used exclusively for fastening and assembly of plate members. A rivet-nut-riveter is another kind of manual machine tool used frequently in industry and upholstery, that is also used extensively in rivet-fastening and assembly of avionic products, computers, communication products, vehicles, machineries, and etc, and various sheet members and pipe systems. By way of example, upon utilizing rivet-nut-riveter in fastening and assembly of two plate members, a rivet nut is put through between two plate members, such that a pull rod of rivet-nut-riveter having threaded section is screwed to a rivet nut. Therefore, when a user pressed down on a handle, the pull rod will be actuated to retract backward, so that a riveting mandrel will move backward to cause deformation wrinkles of a grip section on both ends of a rivet nut, hereby achieving connection and fastening of plate members. As such, in this assembly method, a pull rod is actuated to retract backward in realizing connection and fastening of plate members.

However, in proceeding with a nut riveting operation, it is usually realized through the three-stage actions of forward rotation, pulling, and reverse rotation, so as to cause deformation wrinkles of threaded sections on both ends of a rivet nut, hereby successfully retrieving the rivet nut. However, in the design of existing rivet-nut-riveter having single valve or double valves, usually the retraction of rivet nut is not complete, so that user will spend much time in taking out rivet nuts from an oil piston. As such, in case that design improvements can be made to valve switch of manual machine tool, wherein an auxiliary switch is utilized, such that when the retraction of a rivet nut reverse rotation is not complete, a pneumatic device can be actuated in reversely rotating its blades and then retracting a rivet nut completely by pressing down an auxiliary switch, hereby achieving convenience and much economic benefits.

In view of the problems and shortcomings of the prior art, the present invention provides a three-stage valve switch structure, so as to solve the afore-mentioned problems of the prior art.

SUMMARY OF THE INVENTION

A major objective of the present invention is to provide a three-stage valve switch structure having three-stage switch, which can be utilized in a pneumatic machine tool requiring forward rotation, pulling action, and reverse rotation, hereby providing forward rotation, pulling action, and reverse rotation functions.

Another object of the present invention is to provide a three-stage valve switch structure having an auxiliary switch, which can be pressed down to actuate a pneumatic device into reversely rotating its blades, thus being capable of retracting a rivet nut completely, and increasing convenience in its utilization.

To achieve the above-mentioned purpose, the present invention provides a three-stage valve switch structure housed in a pneumatic machine tool, including: a main body, having a first trough body and a second trough body provided therein, the main body can be connected to an air compressor, so that a pneumatic unit in a main body may drive an oil piston in the main body into a pulling action, moreover, the main body is provided with a first air passageway and a second air passageway, and the first trough body is provided with a forward rotation passageway, and a reverse rotation passageway, and are connected respectively to a pneumatic device; a main switch, located in a first trough body, and it can displace in the first trough body and capable of controlling the direction of air flow, so as to put the and the oil piston into forward rotation, pulling action, and reverse rotation, yet the main switch further includes: a main body having a hollow section through the whole length of the main body of the main switch, and having a through hole respectively on it upper and lower portions; a press button made of a solid column body, capable of sliding in the hollow section, and is provided with multiple rubber rings, and that is sleeved onto an outer perimeter of the solid column body, thus restricting the air flowing into the hollow section; and an auxiliary switch, located in the second trough body and is capable of displacing therein, and controlling the direction of air flow.

When a press button of a main switch is pressed down, the press button can slide in a hollow section, so that the rubber rings on the press button is displaced in the hollow section, thus air can enter into the hollow section and exit through the through holes, hereby constituting a first stage action; when proceeding with the first stage action, the air from the air compressor will enter into the forward rotation air passageway from said first air passageway, and then will enter into a pneumatic device, which in turn drives an oil piston into forward rotation. Upon pressing down a press button in the main switch, meanwhile continuing applying pressures, such the main switch move in the first trough body, so that the ring body will block forward rotation air passageway and reverse rotation air passageway, thus constituting a second stage action; when proceeding with the second stage action, the air from air compressor enters a pneumatic unit from first air passageway, in this process, the air entering the pneumatic unit will push the piston axis upward which pushes oil in the oil passageway upward, thus pushing an oil piston in an oil cylinder backward, hereby constituting a pulling action, furthermore, the main switch and the oil piston are both provided with elastic elements thereon, so that when the outside applied force is removed, the elastic elements will drive the main switch and oil piston back to their original positions, then upon returning to its original position of the main switch, the air transported by an air compressor cannot enter into the pneumatic unit, meanwhile, the elastic element on oil piston will push the oil piston forward, thus also pushing oil in an oil cylinder back to oil passageway, thus driving the piston axis downward, so that the air in pneumatic unit will be pushed back into the second air passageway, then passing through the main switch, and flowing to the reverse rotation air passageway, then the air will enter into a reverse rotation air passageway, and then it enter into the pneumatic device, hereby driving the oil piston into reverse rotation. The oil piston can be sleeved & connected with a rivet nut, such that in case that the reverse rotation of the rivet nut is not complete thus it can not be taken out, then an auxiliary switch can be pressed down, hereby leading the air from the air compressor into reverse rotation air passageway, thus constituting a third stage action; subsequently, pressing down the auxiliary switch, so that it moves backward, then the air from air compressor will pass through an air conduit, and then will enter a second trough body from first air passageway, then it will pass through a connecting passageway and enter into a first trough body, and then it will pass through a main switch and enter into reverse rotation air passageway, and then it will enter into a pneumatic device and actuate the oil piston into reverse rotation.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

Figure 1:
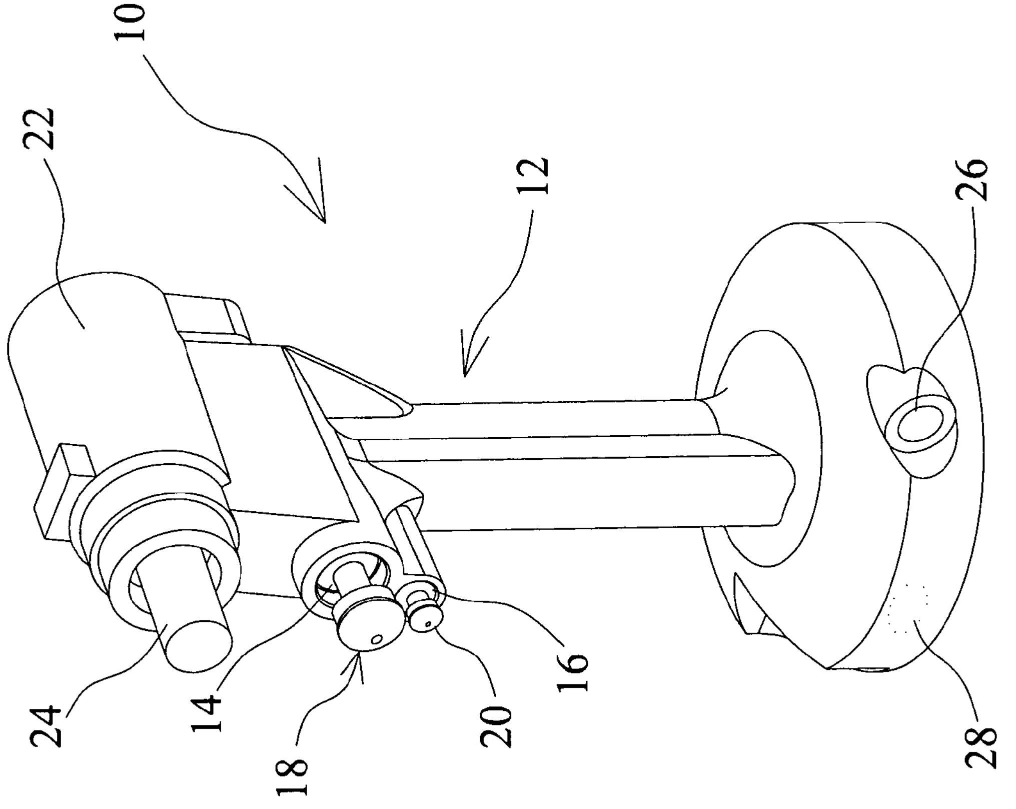
FIG. 1 is a schematic diagram of an overall structure of a three-stage valve switch structure according to an embodiment of the present invention.

Firstly, referring to FIG. 1 for schematic diagram of an overall structure of a three-stage valve switch structure according to an embodiment of the present invention. As shown in FIG. 1, a three-stage valve switch structure is housed in a pneumatic machine tool 10, which function, at least, as a rivet-nut-riveter and a blind-rivet-riveter, etc. The three-stage valve switch structure includes: a main body 12, having a first trough body 14 and a second trough body 16 contained therein, the main body 12 is connected to air compressor (not shown); a main switch 18, located in a first trough body 14, and is capable of moving in first trough body 14, and controlling the direction of air flow; an auxiliary switch 20, located in a second trough body 16, and is capable of moving in second trough body 16, and controlling the direction of air flow; an oil cylinder 22, housed in the upper portion of main body 12, the oil cylinder 22 is provided with an oil piston 24 therein, and the main body 12 is provided with a first air passageway 26 and a second air passageway 28. For details of its connection relations and operation means, referring to the following descriptions with reference to the attached drawings.

Figure 2:
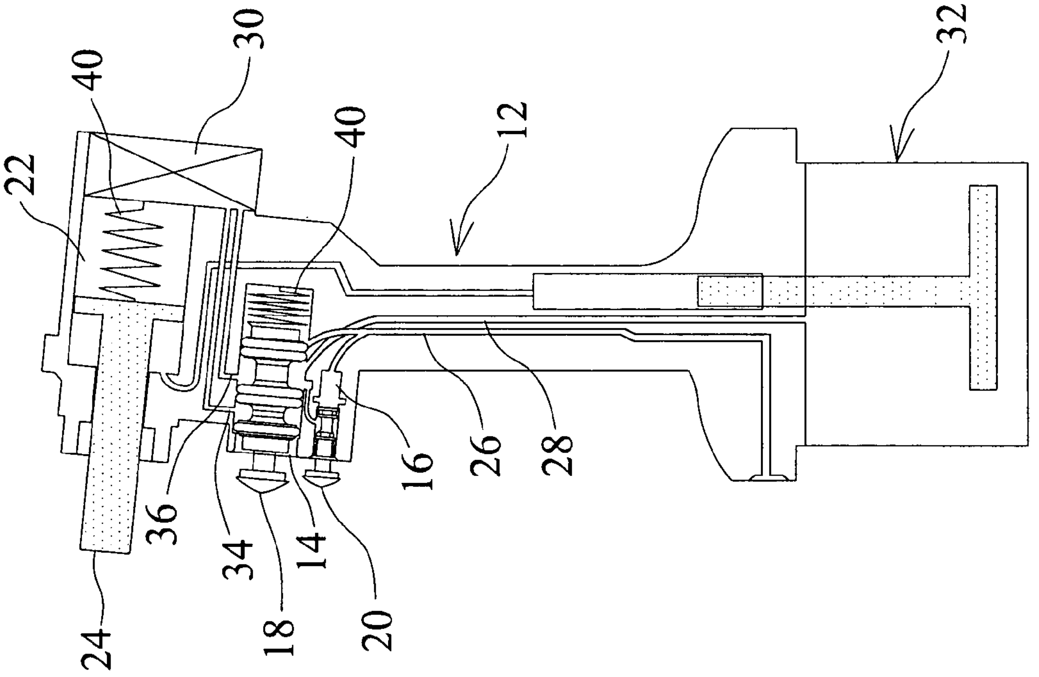
FIG. 2 is a perspective view an overall structure of a three-stage valve switch structure according to an embodiment of the present invention.

Next, referring to FIG. 2 for a perspective view of an overall structure of a three-stage valve switch structure according to an embodiment of the present invention. As shown in FIG. 2, a main body 12 is provided with a first trough body 14 and a second trough body 16 contained therein, and the main body 12 is connected to an air compressor (not shown), so that a pneumatic device 30 and a pneumatic unit 32 in a main body are utilized to drive oil piston 24 in the upper portion of oil cylinder 22 in main body 12 into pulling action. The pneumatic device 30 includes at least a pneumatic motor and a vacuum creating device, and in the example of a rivet-nut-riveter, the pneumatic device 30 is a pneumatic motor. The main body 12 is provided with a first air passageway 26, with its one end connected to an air pump, and with its other end connected to a first tough body 14 and a second trough body 16, the main body 12 is provided with a second air passageway 28 contained therein, and is connected to a first tough body 14 and a pneumatic unit 32, moreover, inside a first trough body 14 is provided with a forward rotation air passageway 34, a reverse rotation air passageway 36, connected respectively to an pneumatic device 30; a main switch 18 is housed in first trough body 14, and can be displaced therein to control the direction of air flow, as such the pneumatic device 30 drives the oil piston 24 into forward rotation, pulling action, and reverse rotation; an auxiliary switch 20, housed in second trough body 16, and can be displaced therein to control the direction of air flow, furthermore, both the main switch 18 and the oil piston 24 are provided respectively with an elastic element 40 thereon, which is usually made of a spring. When the outside applied force is removed, the elastic element 40 will drive the main switch 18 and the oil piston 24 back to their original positions.

Figure 3B:
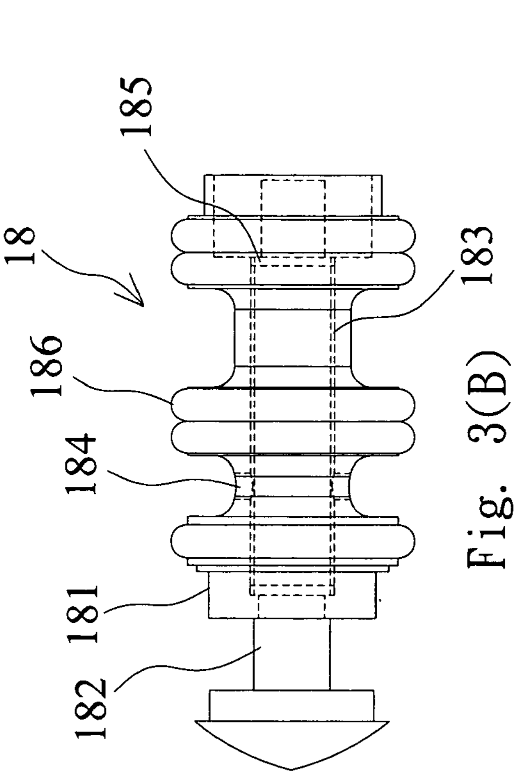
FIG. 3(B) is a schematic diagram of a main switch with its push button not pressed down according to an embodiment of the present invention.
Figure 3C:
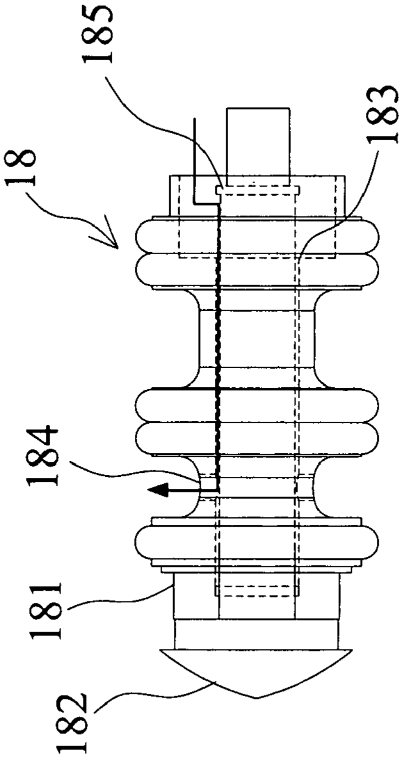
FIG. 3(C) is a schematic diagram of a main switch with its push button pressed down according to an embodiment of the present invention.
Figure 3A:
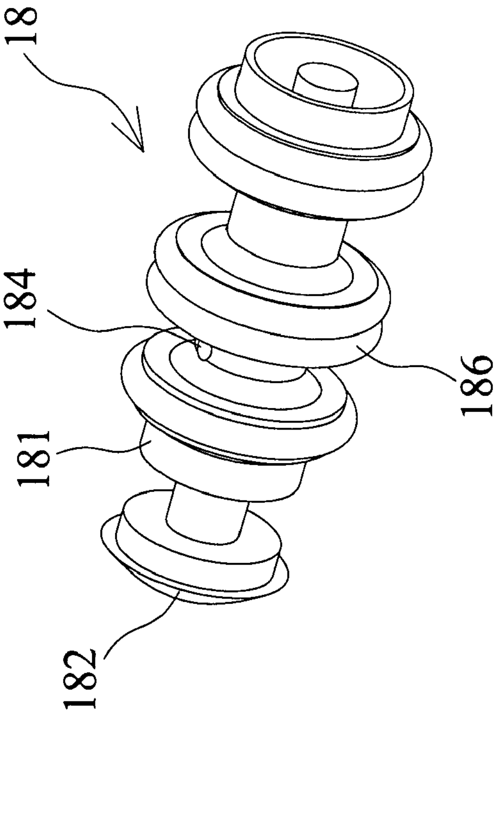
FIG. 3(A) is a schematic diagram of a main switch according to an embodiment of the present invention.

Then, referring to FIG. 3(A) for a schematic diagram of a main switch according to an embodiment of the present invention. As shown in FIG. 3(A), a main switch 18 includes a main body 181 of a column-shaped body, and a press button 182 of a solid column-shaped body. Meanwhile, referring to FIG. 3(B) for a schematic diagram of a main switch with its push button not pressed down according to an embodiment of the present invention, wherein, a hollow section 183 is present throughout the entire length of main body 181 respectively, with its upper and lower portion having a respective through hole 184, a press button 182 can be slidingly moved in hollow section 183, and is provided with multiple rubber rings 185, that are sleeved onto the outer perimeter of a column-shaped body of press button 182, hereby restricting air from flowing into hollow section 184; and multiple ring bodies 186 are sleeved onto the outer perimeter of main body 181, and are used to separate and block airflow, and the ring body 186 is made of rubber or materials that can be used to separate and prevent airflow. Subsequently, referring to FIG. 3(C) for a schematic diagram of a main switch with its push button pressed down according to an embodiment of the present invention. As shown in FIG. 3(C), when applying an outside force on press button 182, the press button 182 is made to move slidingly in a hollow section 183 of a main body 181, since the press button 182 is provided with rubber ring 185 sleeved onto the outer perimeter of its column-shaped body, meanwhile, referring to FIG. 3(B), when the press button 182 is not pressed down, the rubber ring 185 is used to block the hollow section 183, so that air can not enter into the hollow section 183, and on other hand, when the press button is pressed down as shown in FIG. 3(C), the press button is made to move slidingly so that the plastic ring 185 is detached from the hollow section 183, as such, air will enter into the hollow section 183 and exit through a through hole 184 (as shown by arrows).

Figure 4:
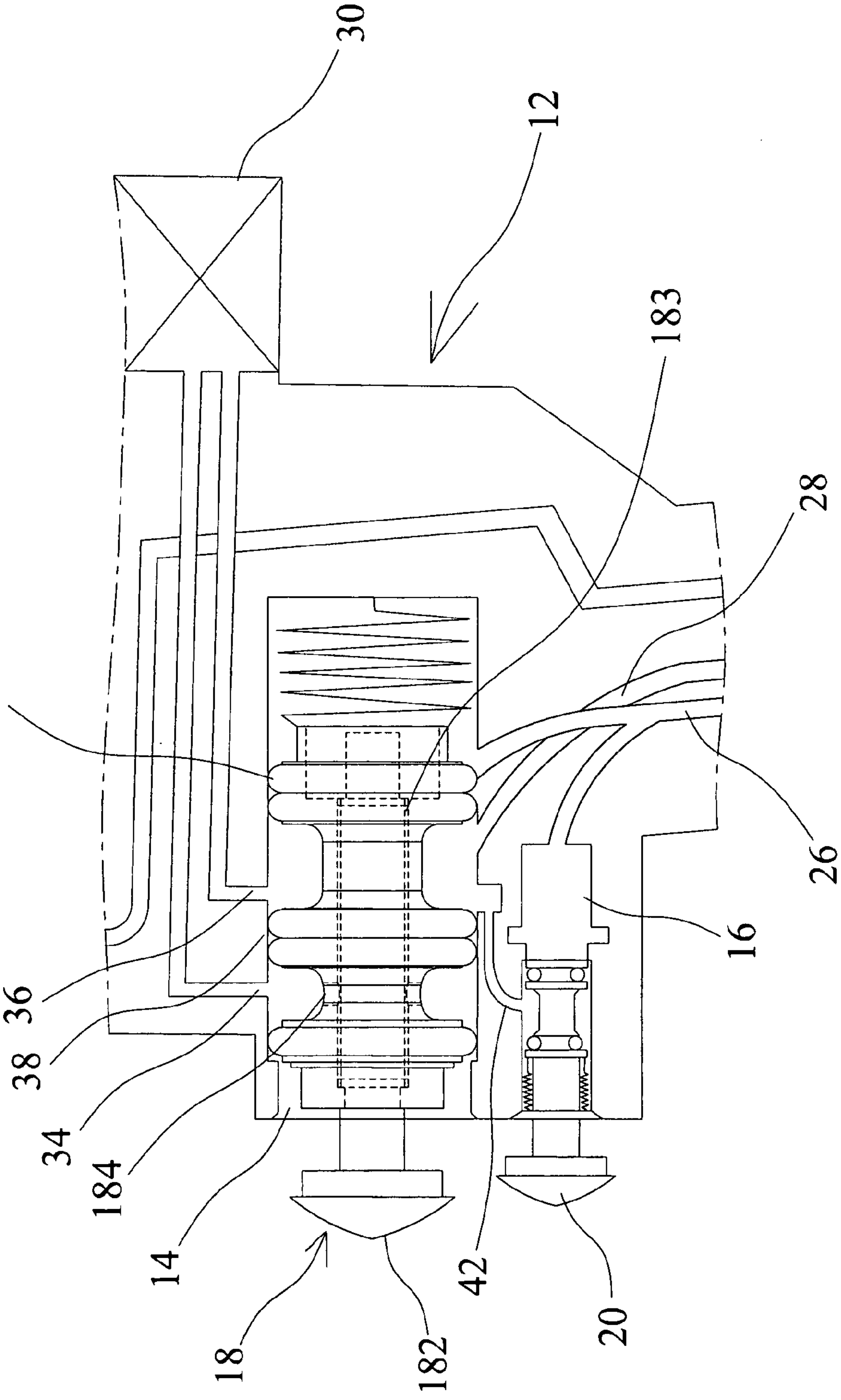
FIG. 4 is a partial perspective view of a main switch not pressed down according to an embodiment of the present invention.

Subsequently, referring to FIG. 4 for a partial perspective view of a main switch not pressed down according to an embodiment of the present invention. As shown in FIG. 4, the internal elements of main body 12 can be seen more clearly in details through this partially enlarged perspective drawing. Wherein, a first air passageway 26 is connected to an air compressor outside and is used to provide air, thus air flows from the first air passageway 26 into a first trough body 14, yet since the press button 182 of a main switch 18 is not pressed down, thus air can not enter into the hollow section 183, meanwhile, due to the sealing of ring bodies 186, air cannot enter forward rotation air passageway 34 and reverse rotation air passageway 36 and into a pneumatic device 30; moreover, a connecting air passageway 42 is provided between a first trough body 14 and a second trough body 16, at this time, since an auxiliary switch 20 is not pressed down and is not made to move in the second trough body 16, the air entering into the second trough body 16 from the first air passageway 26 is blocked and cannot pass through and enter the connecting air passageway 42.

Figure 5:
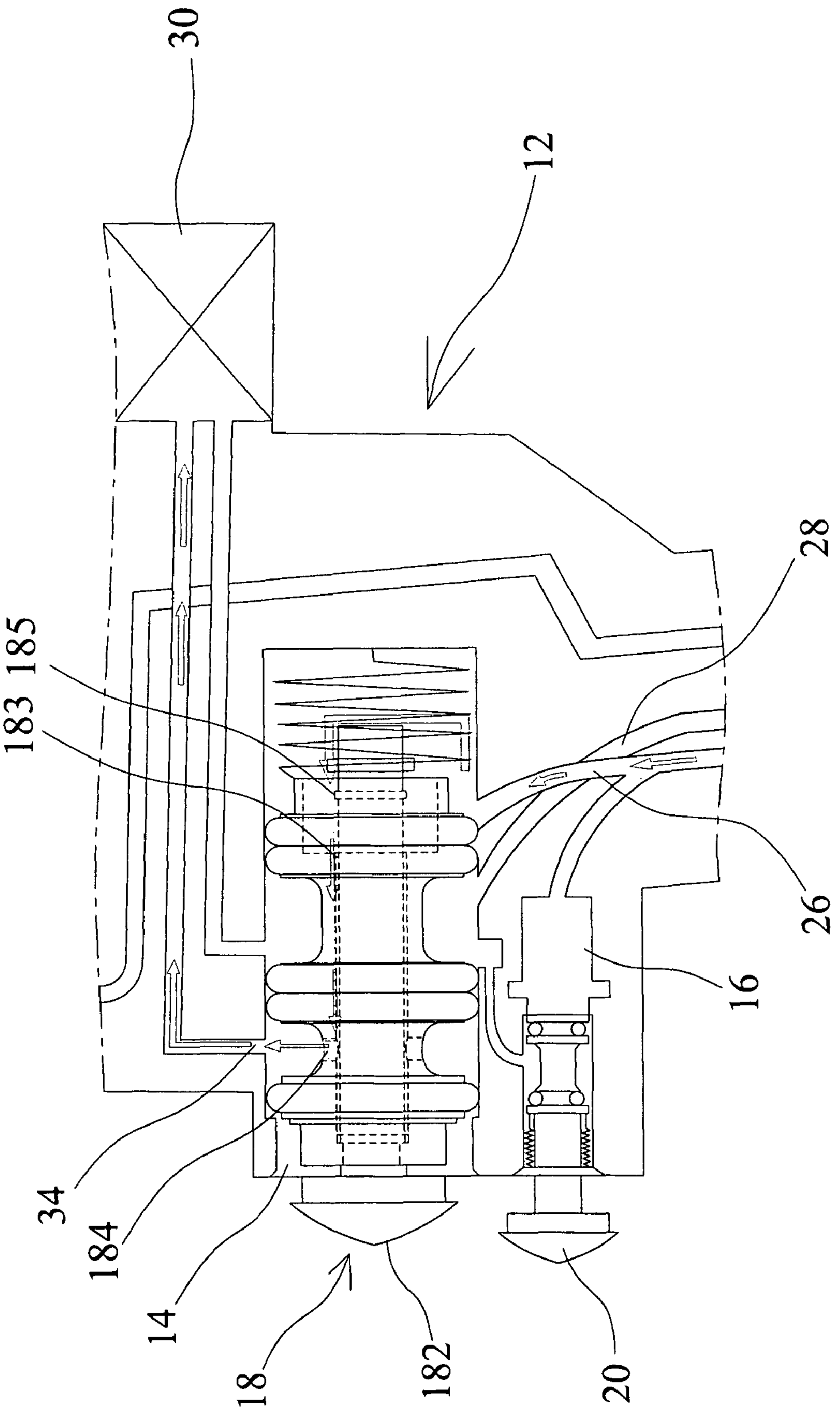
FIG. 5 is a partial perspective view of a three-stage valve switch structure in forward rotation state according to an embodiment of the present invention.

Moreover, referring to FIG. 5 for a partial perspective view of a three-stage valve switch structure in forward rotation state according to an embodiment of the present invention. As shown in FIG. 5, when a press button 182 of a main switch 18 is pressed down, the press button 182 is made to move slidingly in a hollow section 183, so that in the hollow section 183, the rubber rings 185 sleeved onto press button 182 are displaced, thus air can enter into the hollow section 183 and exit through a through hole 184, hereby constituting the first stage action, at this time. When proceeding with the first stage action, the air (as shown by arrows) from air compressor will enter into the first trough body 14 from the first air passageway 26, and will then enter into hollow section 183, and exit through a through hole 184, subsequently, the air will enter into forward rotation air passageway 34 and proceed into a pneumatic device 30 and drive oil piston into forward rotation.

Figure 6A:
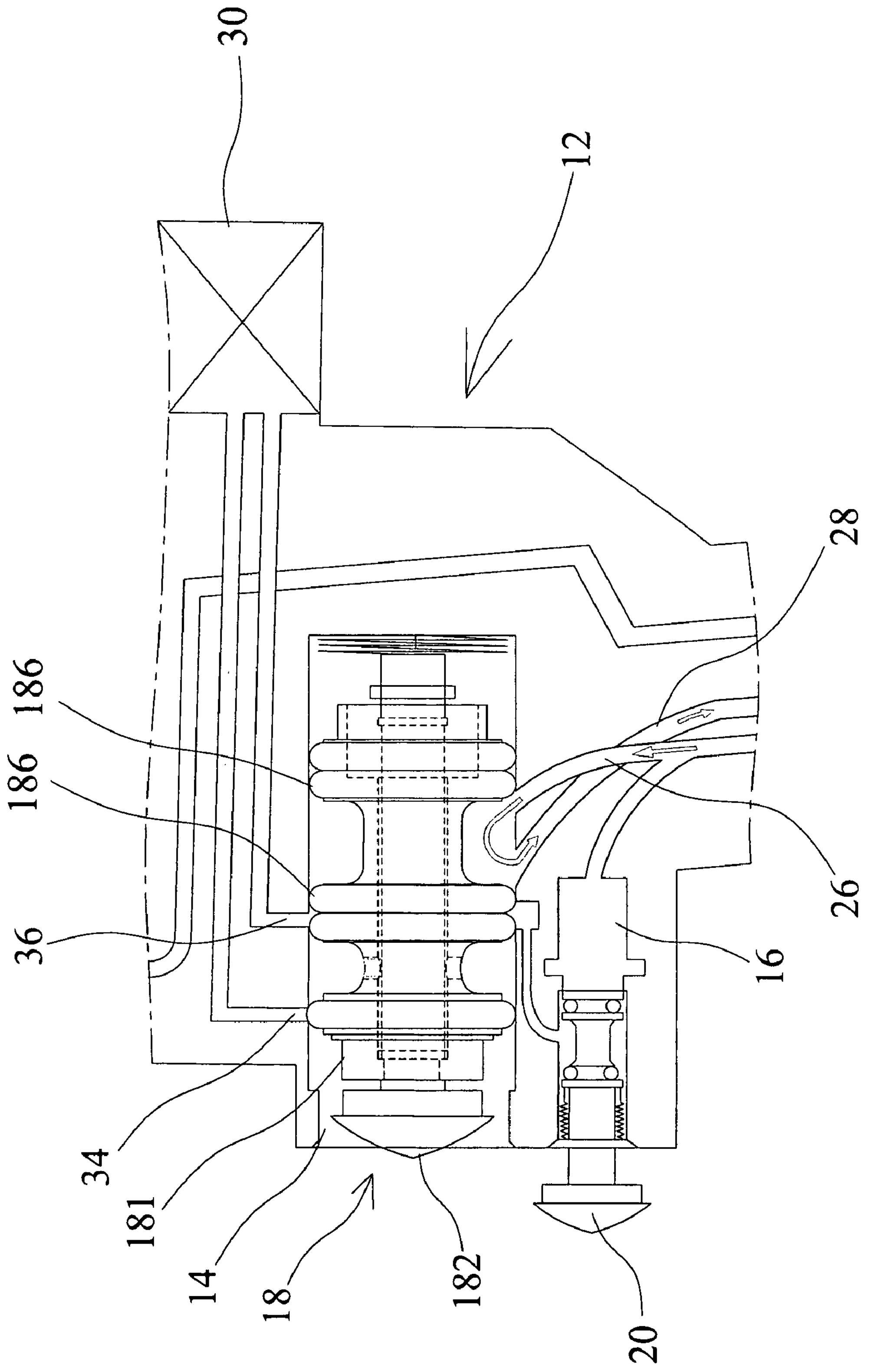
FIG. 6(A) is a partial perspective view of a three-stage valve switch structure in pulling action state according to an embodiment of the present invention.
Figure 6B:
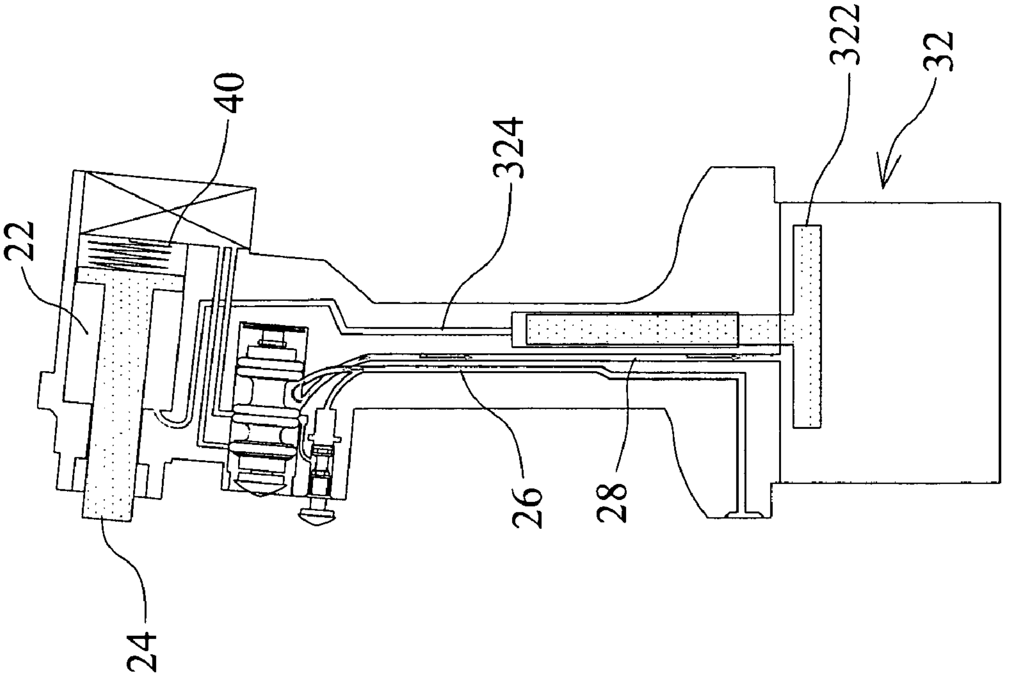
FIG. 6(B) is an overall schematic diagram of a three-stage valve switch structure in pulling action state according to an embodiment of the present invention.

Then, referring to FIG. 6(A) for a partial perspective view of a three-stage valve switch structure in pulling action state according to an embodiment of the present invention. As shown in FIG. 6(A), after pressing down the press button 182 of a main switch 18, meanwhile continuing applying pressure, so that main body 181 is made to displace in a first trough body 14, thus ring bodies 186 block forward rotation air passageway 34, and reverse rotation air passageway 36, hereby constituting a second stage action. When proceeding with the second stage action, the air from air compressor (as shown by arrows) enters into the first trough body 14 from a first air passageway 26, and exits to second air passageway 28. Meanwhile, referring to FIG. 6(B) for an overall schematic diagram of a three-stage valve switch structure in pulling action state according to an embodiment of the present invention, wherein, air enters into the first trough body 14 from first air passageway 26, and then exits to second air passageway 28 and enters into a pneumatic unit 32; the pneumatic unit 32 further includes a piston axis 322 and an oil passageway 324, and the piston axis 322 is connected to the oil passageway 324, and the oil piston 24 is located in an oil cylinder 22, as such, when air (as shown by arrows) enters into pneumatic unit 32, the piston axis 322 is pushed upward, this in turn, pushes the oil in oil passageway 324 upward and drive the oil piston 24 in oil cylinder 22 in moving backward, hereby constituting the pulling action.

Figure 7A:
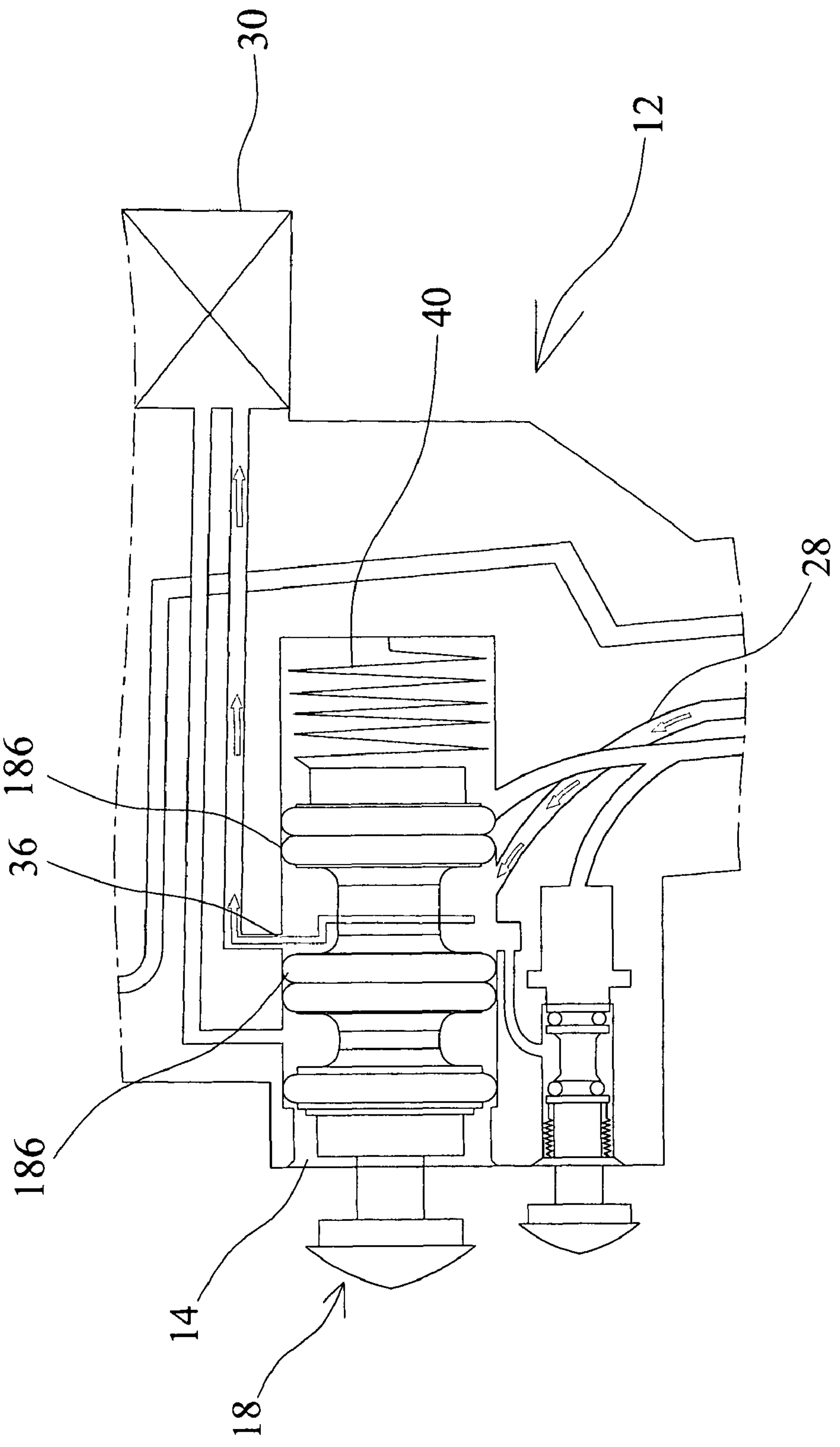
FIG. 7(A) is a partial perspective view of a three-stage valve switch structure in a reverse rotation state according to an embodiment of the present invention.
Figure 7B:
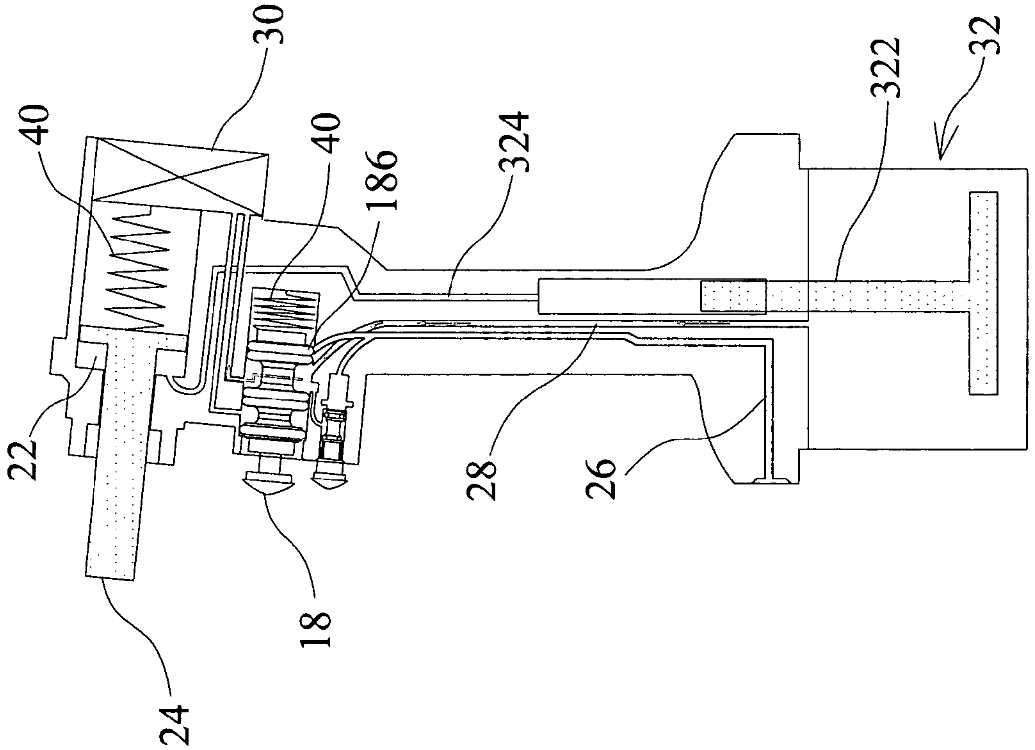
FIG. 7(B) is an overall schematic diagram of a three-stage valve switch structure in a reverse rotation state according to an embodiment of the present invention.

Furthermore, referring to FIG. 7(A) for a partial perspective view of a three-stage valve switch structure in reverse rotation state according to an embodiment of the present invention. Meanwhile, referring to FIG. 7(B) for an overall schematic diagram of a three-stage valve switch structure in reverse rotation state according to an embodiment of the present invention. Firstly, referring to FIG. 7(B). As shown in FIG. 7(B), since elastic element 40 is provided on an oil piston 24, thus when outside applied force is removed, the elastic element 40 will drive the main switch 18 and the oil piston 24 back to their original positions, as such, when the main switch 18 is back into its original position, the air from air compressor through first air passageway 26 is blocked and separated by ring bodies 186, hereby not being able to enter into a pneumatic unit 32, meanwhile, the elastic element 40 on an oil piston 24 will push the oil piston 24 to move forward, due to the forward movement of oil piston 24, thus pushing the oil in an oil cylinder 22 back into oil passageway 324, then, the oil in oil passageway 324 will drive the piston axis 322 to move downward, and pushing the air in pneumatic unit 32 back into a second air passageway 28. Subsequently, referring back to FIG. 7(A), when the air is pushed back, it will enter into a first trough body 14 through second air passageway 28, since the main switch 18 is driven by elastic element 40 back into its original position, thus the air (as shown by arrows) passing though the main switch 18 will flow directly into a reverse rotation air passageway 36 due to the blockage and separation of ring bodies 186, and then the air will enter into a reverse rotation air passageway 36, and will proceed into a pneumatic device 30 for driving an oil piston into reverse rotation.

Figure 8:
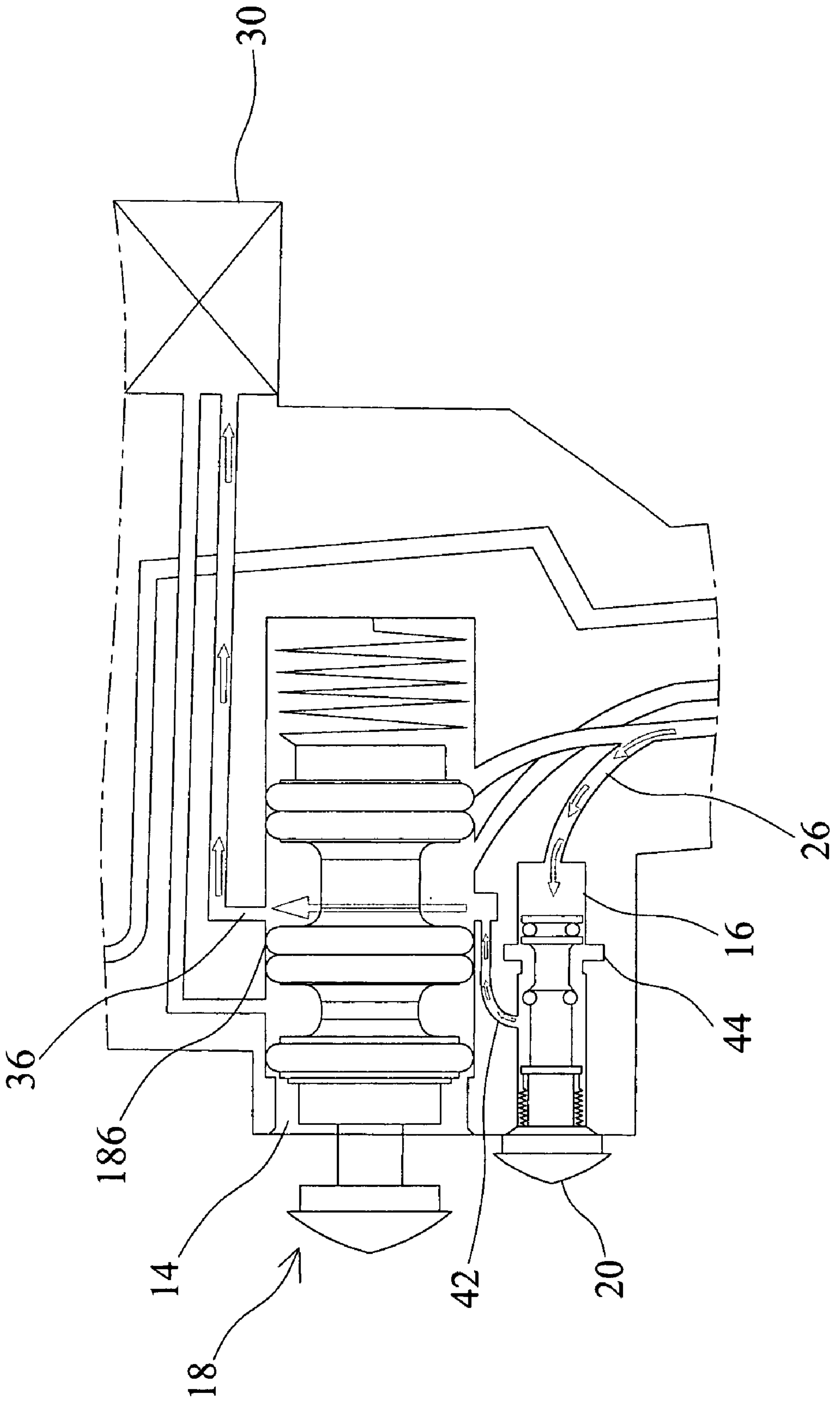
FIG. 8(A) is a partial perspective view of an auxiliary switch in action state according to an embodiment of the present invention.
FIG. 8(B) is an overall schematic diagram of an auxiliary switch in action state according to an embodiment of the present invention.
Figure 8A:
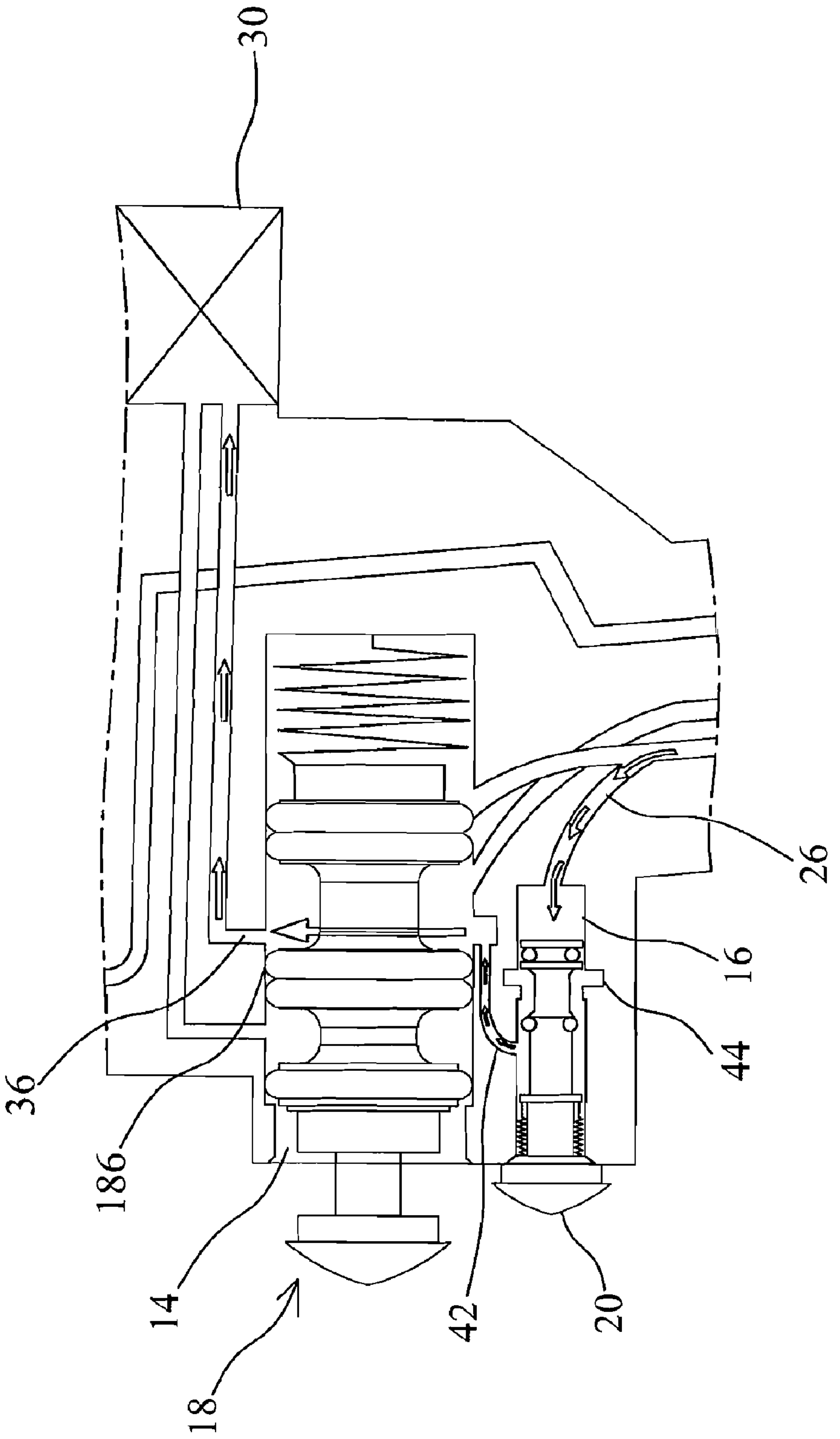
Figure 8B:
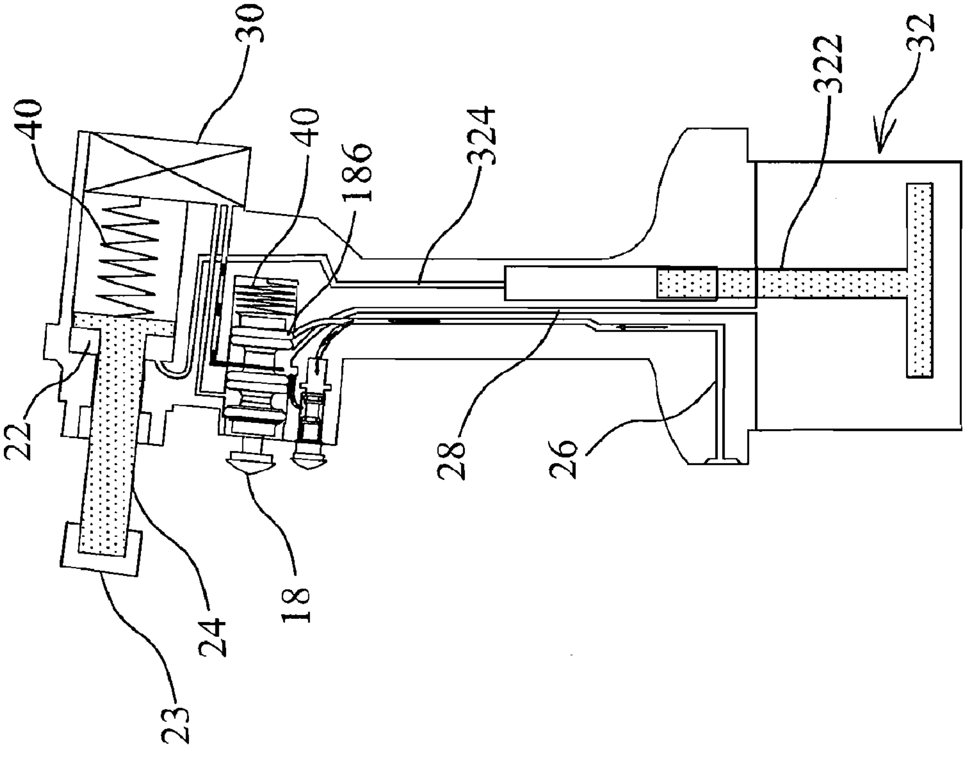

As shown in FIGS. 8(A) and 8(B), since a rivet nut 23 is sleeved onto an oil piston, then in case that the withdrawal of oil piston 24 from a rivet nut 23 is not complete and thus it can not be taken out, then it can be retrieved successfully through pressing down an auxiliary switch in assisting a pneumatic device into reverse rotation. Therefore, as shown in FIGS. 8(A) and 8(B), pressing down an auxiliary switch 20, then, the air from air compressor can be guided into reverse rotation air passageway 36 from first air passageway 26, thus constituting a third stage action; the second trough body is provided with an air conduit 44, thus when the auxiliary switch 20 is pressed down, the auxiliary switch 20 is made to move backwards slidingly in the second trough body 16, and the air (as shown by arrows) from air compressor enters into a second trough body 16 through first air passageway 26, and since the auxiliary switch 20 slide and moved back, thus air can pass though an air conduit 44, then air will enter into first tough body 14 after passing through connecting air passageway 42, and then due to the blockage of ring body 186, the air will pass through a main switch 18 directly and enter into reverse rotation air passageway 36, as such, the air entering into reverse rotation air passageway 36 will proceed to a pneumatic device 30 in driving an oil piston into reverse rotation, hereby making the withdrawal from rivet nut 23 complete and it can be taken out successfully.

Figure 9A:
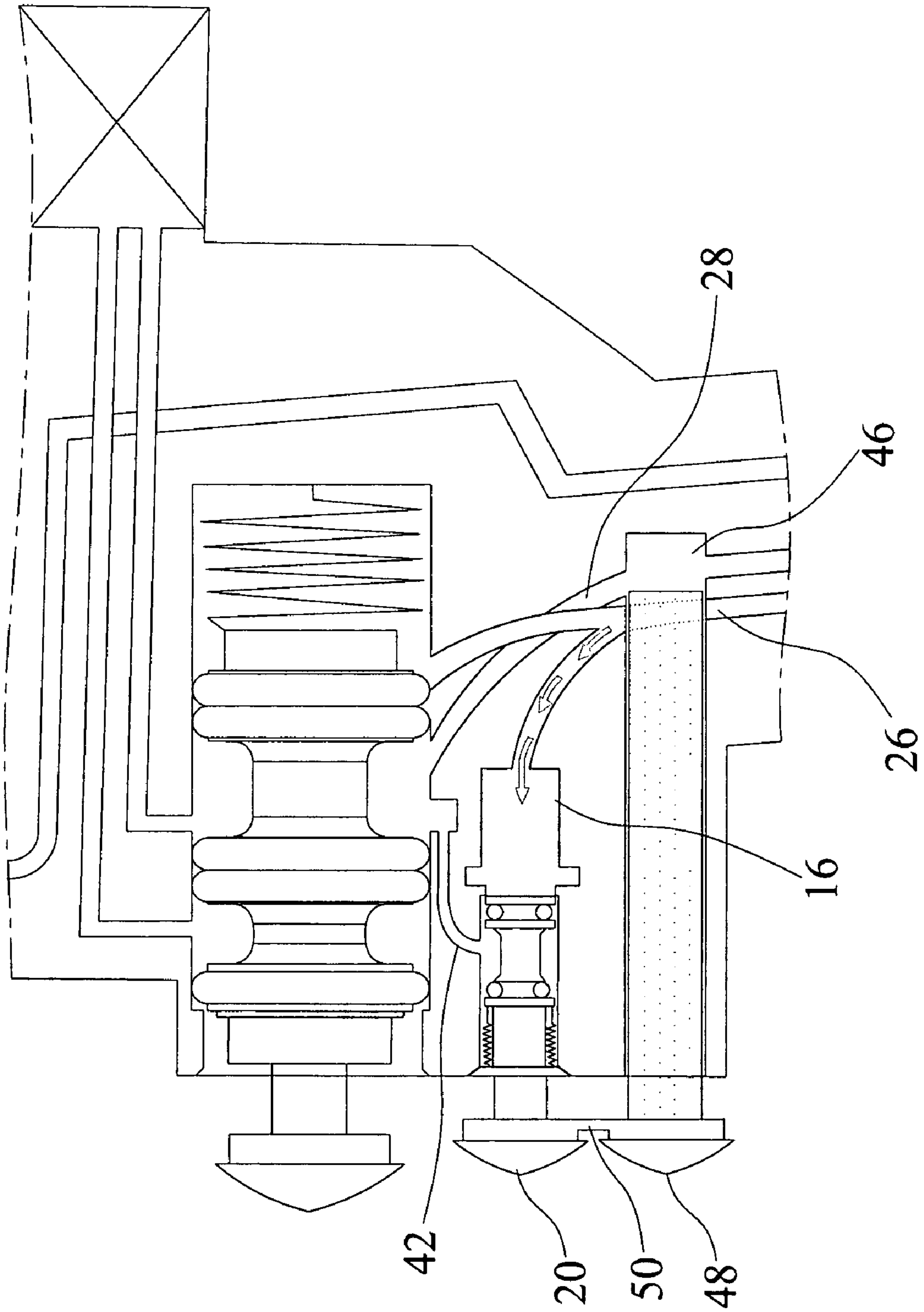
FIG. 9(A) is a partial perspective view of an auxiliary switch that is not pressed down according to another embodiment of the present invention.
Figure 9B:
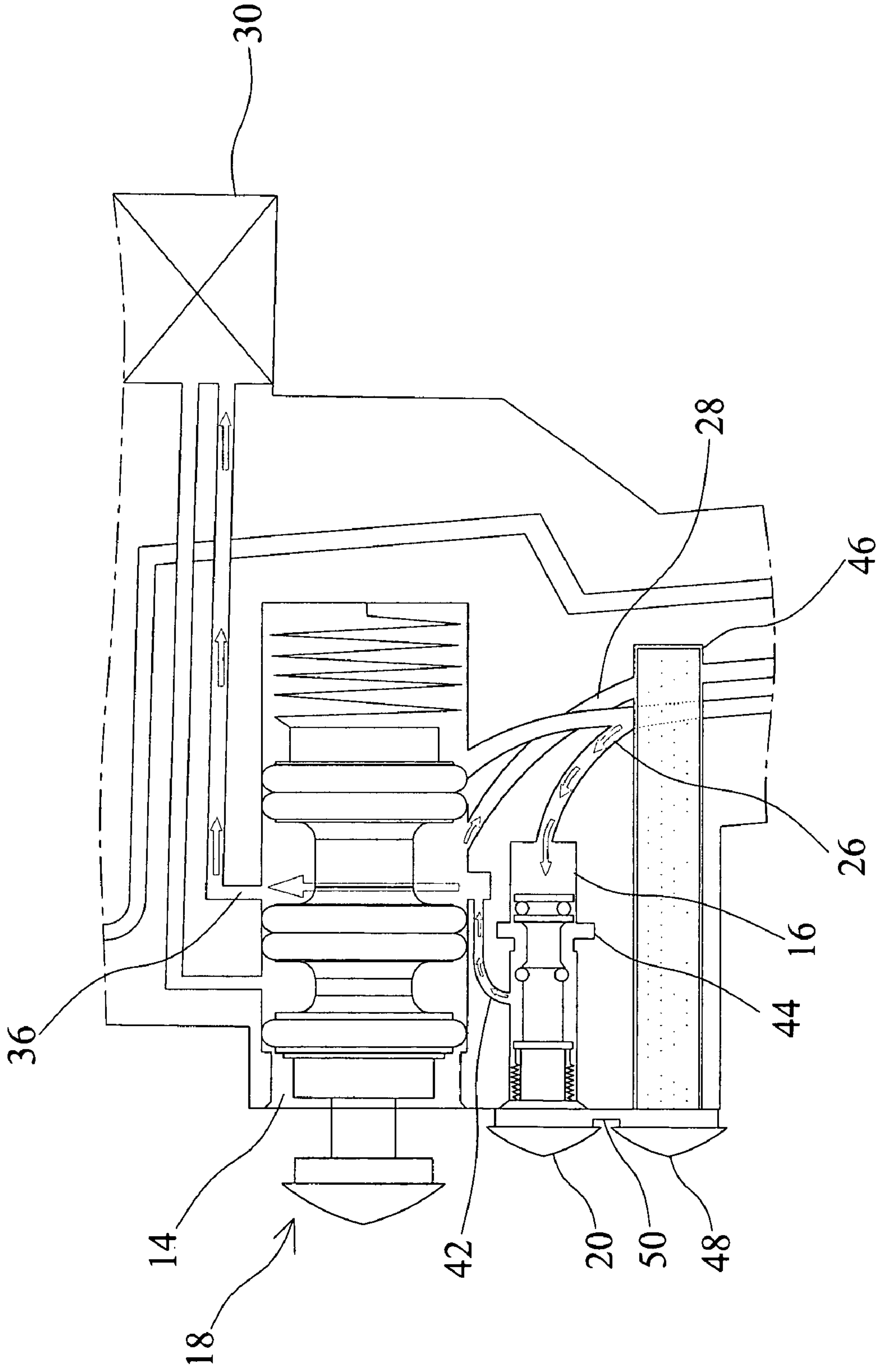
FIG. 9(B) is a partial perspective view of an auxiliary switch that is pressed down according to another embodiment of the present invention.

Moreover, referring to FIG. 9(A) for a partial perspective view of an auxiliary switch that is not pressed down according to another embodiment of the present invention. As shown in FIG. 9(A), a third trough body 46 is housed in a main body 12 below an auxiliary switch 20, the third trough body passes through the second air passageway 28, and it will not interfere with the first air passageway 26 due to an interleaving design of pipelines. The third trough body 46 is further provided with a second auxiliary switch 48 therein, which is able to move slidingly in the third trough body 46; the second auxiliary switch 48 is connected to auxiliary switch 20 through a connection portion 50, and can be moved in cooperation with auxiliary switch 20, since the auxiliary switch 20 is not pressed down, thus the air entering into the second trough body 16 from the first air passageway 26 is blocked, and cannot enter into connecting air passageway 42, meanwhile, the second auxiliary switch 48 is not displaced in the third trough body 46. Finally, referring to FIG. 9(B) for a partial perspective view of an auxiliary switch that is pressed down according to another embodiment of the present invention. As shown in FIG. 9(B), when an auxiliary switch 20 is pressed down, the air (shown by arrows) from air compressor can enter into second trough body 16 from first air passageway 26, and it will pass through first trough body 14 and main switch 18 from connecting air passageway 42, and enter into a reverse rotation air passageway 36, however, due to design restrictions, a small portion of air will still flow into a second air passageway 28, in order to prevent this condition from happening, the presence of a second auxiliary switch 48 can help, so that when an auxiliary switch 20 is pressed down, since the second auxiliary switch 48 is provided with a connection portion 50 and is connected to an auxiliary switch 20, as such, when the auxiliary switch 20 is pressed down, it will connect and drive the second auxiliary switch, so that the second auxiliary switch 48 will move backward in the third trough body 46 at the same time, thus the air in the second air passageway 28 is blocked, and it is prevented from further entering into pneumatic unit 32. In the present embodiment, through the installation of a second auxiliary switch, which can move in cooperation with the auxiliary switch. Therefore, through the application of the second auxiliary switch, the air flow in the second air passageway can be controlled.

In the present invention, a three-stage valve switch structure is provided, which can be applied in a pneumatic machine tool, for example a rivet-nut-riveter, such that it can be used to actuate a pneumatic device into driving an oil piston into forward rotation, pulling action, and reverse rotation. The present invention is also provided with an auxiliary switch, such that in the case of withdrawing from a rivet nut performed by a pneumatic machine tool is not complete, the auxiliary switch 20 can be pressed down in driving a pneumatic device 30 into rotating its blades in a reverse manner, thus making the withdrawal from a rivet nut more complete, and enhancing convenience in its utilization. In addition, in the present invention, a second auxiliary switch 48 can be added as shown in an embodiment of FIG. 9, in preventing air flowing into second air passageway 28. In the present embodiment, the pneumatic device 30 is a pneumatic motor, and that is utilized in a rivet-nut-riveter. As such, depending on various different requirements, the three-stage valve switch structure of the present invention can be used in various pneumatic machine tools in performing three-stage air flow control and variations.

The above detailed description of the preferred embodiment is intended to describe more clearly the characteristics and spirit of the present invention. However, the preferred embodiments disclosed above is not intended to be any restrictions to the scope of the present invention. Conversely, its purpose is to include the various changes and equivalent arrangements which are within the scope of the appended claims.

What is claimed is:

1. A three-stage valve switch structure housed in a pneumatic manual machine tool, comprising:

a main body, having a first trough body and a second trough body provided therein, said main body being connected to an air compressor, so that a pneumatic device and a pneumatic unit in said main body drive an oil piston in said main body into a pulling action, said first trough body being provided with a forward rotation air passageway, and a reverse rotation air passageway, connected respectively to said pneumatic device;

a main switch, located in said first trough body, and is displaced in said first trough body and is capable of controlling direction of air flow, so as to put said pneumatic device and said oil piston into forward rotation, pulling action, and reverse rotation, said main switch further comprises:

a main body, made of a column-shaped body, and having a hollow section through an entire length of the column-shaped body, and having a through hole respectively on its upper and lower portion;

a press button, made of a solid column-shaped body, capable of slidingly moving in said hollow section, and is provided with multiple rubber rings, sleeved onto an outer perimeter of said column-shaped body, thus restricting said air from flowing into said hollow section;

multiple ring bodies, sleeved onto said outer perimeter of said main body of said main switch for blocking and separating air flow; and an auxiliary switch, located in and moves in said second trough body and is capable of controlling direction of said air flow, wherein upon pressing down said press button on said main switch, meanwhile continuing applying pressures, thus said main body moves in said first trough body, so that said ring body blocks said forward rotation air passageway and said reverse rotation passageway, hereby constituting a second stage action.

2. The three-stage valve switch structure housed in a pneumatic machine tool as claimed in claim 1, wherein
a connecting air passageway is provided between said first trough body and said second trough body.

3. The three-stage valve switch structure housed in a pneumatic machine tool as claimed in claim 1, wherein
said main body of said three-stage valve switch structure is provided with a first air passageway, with its one end connected to said air compressor, and with its other end connected to said first trough body and said second trough body.

4. The three-stage valve switch structure housed in a pneumatic machine tool as claimed in claim 1 or 3, wherein
when in proceeding with said second stage action, said air of said air compressor will enter into said first trough body from said first air passageway, and then will exit to said second air passageway and enter into said pneumatic unit.

5. The three-stage valve switch structure housed in a pneumatic machine tool as claimed in claim 1, wherein
said main body of said three-stage valve switch structure is provided with an air passageway which is connected to said first trough body and said pneumatic unit.

6. The three-stage valve switch structure housed in a pneumatic machine tool as claimed in claim 1, wherein
when pressing down said press button of said main switch, said press button is made to move slidingly in said hollow section, so that said rubber ring on said press button is displaced from said hollow section, thus air enters into said hollow section and exits through said through holes, thus constituting a first stage action.

7. The three-stage valve switch structure housed in a pneumatic machine tool as claimed in claim 3 or 6, wherein
when in proceeding with said first stage action, said air in said air compressor will enter into said first trough body from said first air passageway, and exit through said through holes, and then will enter into said forward rotation air passageway, and will proceed into said pneumatic device, which will in turn drive said oil piston into forward rotation.

8. The three-stage valve switch structure housed in a pneumatic machine tool as claimed in claim 1, wherein
said oil piston is located in an oil cylinder, said oil cylinder is provided with an oil passageway connected to said pneumatic unit.

9. The three-stage valve switch structure housed in a pneumatic machine tool as claimed in claim 8, wherein
said pneumatic unit further includes a piston axis connected to said oil passageway.

10. The three-stage valve switch structure housed in a pneumatic machine tool as claimed in claim 4, wherein
said air entering into said pneumatic unit will push said piston axis upward, thus pushing oil in oil passageway upward and drive said oil piston in said oil cylinder to move backward, hereby constituting a pulling action.

11. The three-stage valve switch structure housed in a pneumatic machine tool as claimed in claim 9, wherein said air entering into said pneumatic unit will push said piston axis upward thus pushing oil in an oil passageway upward and drive said oil piston in said oil cylinder to move backward, hereby constituting a pulling action.

12. The three-stage valve switch structure housed in a pneumatic machine tool as claimed in claim 1, wherein
elastic elements are provided on said main switch and said oil piston, so that when an outside applied force is removed, said elastic elements will drive said main switch and oil piston back to their original positions.

13. The three-stage valve switch structure housed in a pneumatic machine tool as claimed in claim 12, wherein
upon returning to said original position of said main switch, said air from said air compressor does not enter into said pneumatic unit, meanwhile, said elastic element on said oil piston will push said oil piston to move forward, thus also pushing oil in said oil cylinder back to said oil passageway.

14. The three-stage valve switch structure housed in a pneumatic machine tool as claimed in claim 13, wherein
said oil passageway will drive said piston axis downward, so that said air in said pneumatic unit will be pushed back into said second air passageway, and will pass through said main switch, and flowing into said reverse rotation air passageway.

15. The three-stage valve switch structure housed in a pneumatic machine tool as claimed in claim 14, wherein
said air enters into said reverse rotation air passageway, and flows into said pneumatic device, hereby driving the oil piston into reverse rotation.

16. The three-stage valve switch structure housed in a pneumatic machine tool as claimed in claim 1, wherein
said oil piston is sleeved onto said rivet nut.

17. The three-stage valve switch structure housed in a pneumatic machine tool as claimed in claim 16, wherein
in case that retrieval of said rivet nut is not complete thus said rivet nut is not taken out, then said auxiliary switch is pressed down, hereby leading said air from said air compressor into a reverse rotation air passageway, thus constituting a third stage action.

18. The three-stage valve switch structure housed in a pneumatic machine tool as claimed in claim 1, wherein
said second trough body is provided with an air conduit.

19. The three-stage valve switch structure housed in a pneumatic machine tool as claimed in claims 1, 2, 3, or 18, wherein
pressing down said auxiliary switch, so that it is moved backward, then said air from said air compressor enters into said second trough body from said first air passageway by passing through said air conduit, and then it will pass through said connecting air passageway and enter into said first trough body, then it will pass through said main switch and enter into said reverse rotation air passageway.

20. The three-stage valve switch structure housed in a pneumatic machine tool as claimed in claim 19, wherein
said air enters into said reverse rotation air passageway, and then flows to said pneumatic device in driving said oil piston into reverse rotation.

21. The three-stage valve switch structure housed in a pneumatic machine tool as claimed in claim 1, wherein
said ring body is made of rubber material or materials that have sealing properties.

22. The three-stage valve switch structure housed in a pneumatic machine tool as claimed in claim 1, wherein
said pneumatic machine tool functions at least as a blind-rivet-riveter and a rivet-nut-riveter.

23. The three-stage valve switch structure housed in a pneumatic machine tool as claimed in claim 1, wherein
said pneumatic device includes a pneumatic motor and a vacuum creating device.

24. The three-stage valve switch structure housed in a pneumatic machine tool as claimed in claim 1, wherein
said main body of the three-stage valve switch is provided with a third trough body.

25. The three-stage valve switch structure housed in a pneumatic machine tool as claimed in claim 24, wherein said third trough body is provided with a second auxiliary switch therein, which is able to move slidingly in said third trough body, and move in cooperation with said auxiliary switch.

26. The three-stage valve switch structure housed in a pneumatic machine tool as claimed in claim 24, wherein said second auxiliary switch is used to control air flow of said second air passageway.

27. The three-stage valve switch structure housed in a pneumatic machine tool as claimed in claim 24, wherein said main body of said three-stage valve switch structure is provided with an air passageway which is connected to said first trough body and said pneumatic unit; and said third trough body passes through said air passageway.

* * * * *